(12) United States Patent
Matthews et al.

(10) Patent No.: US 9,342,134 B2
(45) Date of Patent: May 17, 2016

(54) POWER CONSUMPTION REDUCTION IN A COMPUTING DEVICE

(71) Applicant: INTEL CORPORATION, Santa Clara, CA (US)

(72) Inventors: Shane Matthews, Portland, OR (US); Christopher Hall, Portland, OR (US)

(73) Assignee: Intel Corporation, Santa Clara, CA (US)

(*) Notice: Subject to any disclaimer, the term of this patent is extended or adjusted under 35 U.S.C. 154(b) by 245 days.

(21) Appl. No.: 14/040,284

(22) Filed: Sep. 27, 2013

(65) Prior Publication Data

US 2015/0095686 A1    Apr. 2, 2015

(51) Int. Cl.
*G06F 1/32* (2006.01)
*H04N 1/00* (2006.01)

(52) U.S. Cl.
CPC ............ *G06F 1/3287* (2013.01); *G06F 1/3268* (2013.01); *G06F 1/3275* (2013.01); *H04N 1/00* (2013.01); *G06F 1/3203* (2013.01)

(58) Field of Classification Search
CPC .................................................. G06F 1/3287
USPC ......................................................... 713/324
See application file for complete search history.

(56) References Cited

U.S. PATENT DOCUMENTS

| | | | |
|---|---|---|---|
| 6,647,499 B1 | 11/2003 | Morcom | |
| 2004/0062119 A1* | 4/2004 | Stimak et al. | 365/222 |
| 2005/0201719 A1* | 9/2005 | Kang et al. | 386/46 |
| 2007/0208911 A1* | 9/2007 | Robbin et al. | 711/138 |
| 2008/0123211 A1* | 5/2008 | Chng et al. | 360/55 |
| 2008/0168227 A1* | 7/2008 | Yagisawa et al. | 711/114 |
| 2009/0150697 A1* | 6/2009 | Yang | 713/323 |
| 2010/0057983 A1 | 3/2010 | Borras et al. | |
| 2010/0185883 A1* | 7/2010 | Hamilton | 713/320 |
| 2011/0022568 A1* | 1/2011 | Kim | 707/640 |
| 2013/0038615 A1* | 2/2013 | Hendry et al. | 345/502 |
| 2014/0139741 A1* | 5/2014 | Momosaki et al. | 348/553 |

* cited by examiner

*Primary Examiner* — Thomas Lee
*Assistant Examiner* — Volvick Derose
(74) *Attorney, Agent, or Firm* — International IP Law Group, P.L.L.C.

(57) ABSTRACT

Various techniques for reducing power consumption of a computing device are described herein. In one example, a method includes detecting that the computing device is to execute a first operation for a first hardware component. The method can also include determining that the computing device is not to execute a second operation for a second hardware component during a period of time. Furthermore, the method can include loading operation data corresponding to the first operation into a processor cache from a non-volatile storage device and detecting that the first operation is not to request memory data from a volatile storage device. The method can also include removing power from at least one storage device.

25 Claims, 5 Drawing Sheets

300

POWER CONSUMPTION REDUCTION IN A COMPUTING DEVICE

BACKGROUND

1. Field

This disclosure relates generally to power consumption of a computing device, and more specifically, but not exclusively, to reducing the power consumption of a computing device.

2. Description

As the complexity of modern computing devices continues to increase, the computing devices consume additional power to execute instructions. In some examples, the computing devices can consume additional power to execute instructions for a growing number of hardware components included within the computing devices. The computing devices may also execute multiple operations in parallel, which can increase the power consumption of the computing devices. Therefore, many computing devices can consume a large amount of power in order to perform operations for any suitable number of components within a period of time.

BRIEF DESCRIPTION OF THE DRAWINGS

The following detailed description may be better understood by referencing the accompanying drawings, which contain specific examples of numerous features of the disclosed subject matter.

DESCRIPTION OF THE EMBODIMENTS

According to embodiments of the subject matter discussed herein, a computing device can reduce power consumption by accessing data directly from a storage device while removing power to volatile memory devices, among others. In some embodiments, the computing device can reduce power consumption to volatile memory devices while executing operations from a processor cache. A volatile memory device, as referred to herein, can include any suitable memory device that cannot persistently store data without power. For example, a volatile memory device may include any suitable type of random-access memory (also referred to herein as RAM), such as dynamic RAM, among others. In some embodiments, a computing device can stop providing power to a volatile memory device in response to detecting that a processor is to execute audio operations for a period of time. In some examples, the computing device can send data for the audio operations directly to a processor and the processor can transmit data directly to an audio device.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
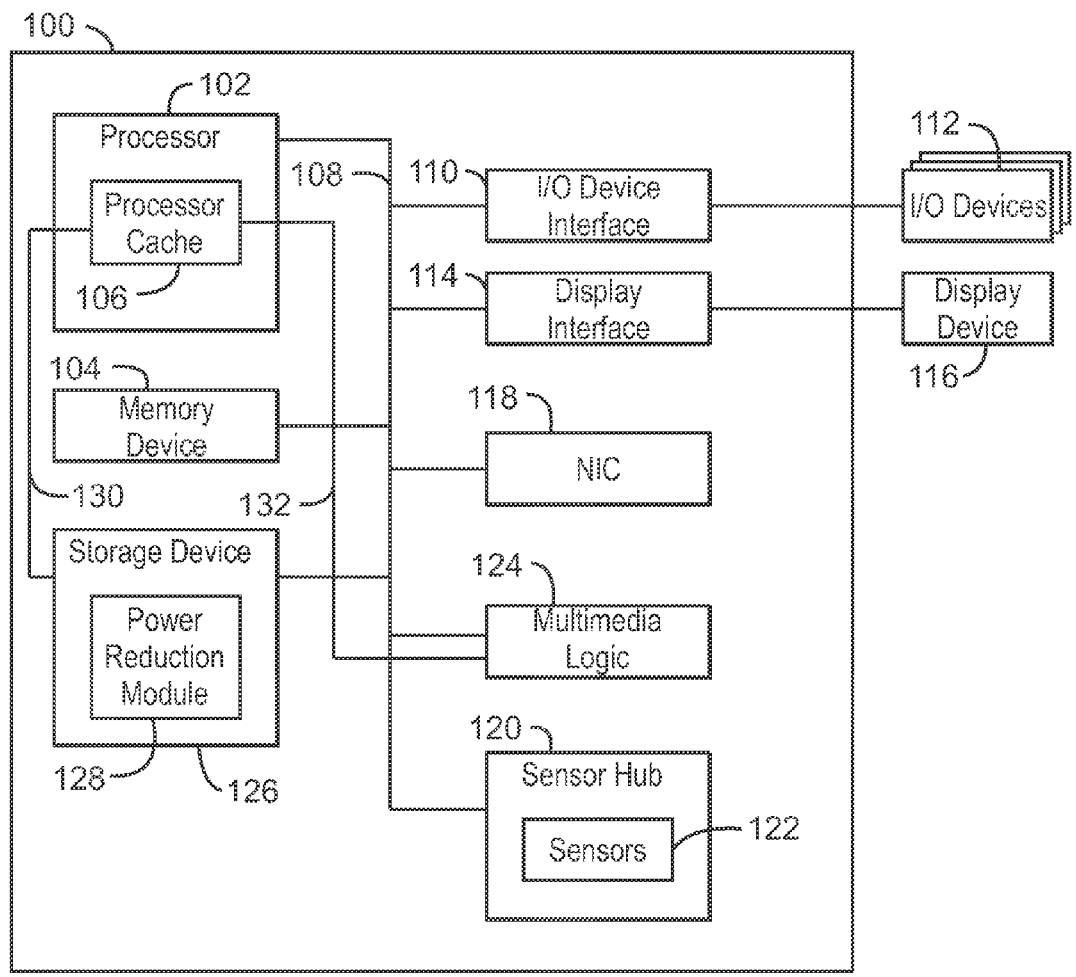
FIG. 1 is a block diagram of an example of a computing system that can reduce power consumption by turning off power to hardware components.

FIG. 1 is a block diagram of an example of a computing system that can reduce power consumption by turning off power to hardware components. The computing device 100 may be, for example, a computing phone, laptop computer, desktop computer, or tablet computer, among others. The computing device 100 may include a processor 102 that is adapted to execute stored instructions, as well as a memory device (also referred to herein as a volatile storage device or volatile memory device) 104 that stores instructions or copies of instructions that are executable by the processor 102. The processor 102 can be a single core processor, a multi-core processor, a computing cluster, or any number of other configurations. In some embodiments, the processor 102 can receive instructions or copies of the instructions from the memory device 104 and store the instructions or copies of the instructions in a processor cache (also referred to herein as cache) 106. The memory device 104 can include random access memory, read only memory, flash memory, or any other suitable memory systems. In some examples, the memory device 104 may be a volatile memory device. The instructions that are executed by the processor 102 may be used to implement a method that can reduce power consumption of a computing device.

The processor 102 may be connected through a system interconnect 108 (e.g., PCI®, PCI-Express®, etc.) to an input/output (I/O) device interface 110 adapted to connect the computing device 100 to one or more I/O devices 112. The I/O devices 112 may include, for example, a keyboard and a pointing device, wherein the pointing device may include a touchpad or a touchscreen, among others. The I/O devices 112 may be built-in components of the computing device 100, or may be devices that are externally connected to the computing device 100.

The processor 102 may also be linked through the system interconnect 108 to a display interface 114 adapted to connect the computing device 100 to a display device 116. The display device 116 may include a display screen that is a built-in component of the computing device 100. The display device 116 may also include a computer monitor, television, or projector, among others, that is externally connected to the computing device 100. In addition, a network interface controller (also referred to herein as a NIC) 118 may be adapted to connect the computing device 100 through the system interconnect 108 to a network (not depicted). The network (not depicted) may be a cellular network, a radio network, a wide area network (WAN), a local area network (LAN), or the Internet, among others.

The processor 102 may also be linked through the system interconnect 108 to a sensor hub 120 that includes any suitable number of sensors 122. For example, the sensors 122 may include an accelerometer, a magnetometer, a gyroscope, a proximity sensor, and a GPS sensor, among others. In some embodiments, the sensors 122 can detect various measurements related to the environment of the computing device 100 such as the location of a computing device 100 or if the computing device 100 is in motion.

The processor 102 may also be linked through the system interconnect 108 to multimedia logic 124. In some embodiments, the multimedia logic 124 can generate audio and/or video output. For example, the multimedia logic 122 may receive data related to audio or video output from the processor 102 and the multimedia logic 122 can process the data to enable audio and/or video playback.

The processor 102 may also be linked through the system interconnect 108 to a storage device (also referred to herein as a non-volatile storage device) 126 that can include a hard drive, an optical drive, a USB flash drive, an array of drives, or any combinations thereof. The storage device 126 may include a power reduction module 128. In some embodiments, the power reduction module 128 can monitor the data transmitted to the processor 102 through the system interconnect 108. If the power reduction module 128 determines that data related to a first operation for a first hardware device has been transmitted to the processor 102, the power reduction module 128 may indicate that the power is to be turned off to a second hardware component such as the memory device 104, among others. For example, the power reduction module 128 may detect that data transmitted to the processor 102 over a period of time is related to an operation to be performed by the multimedia logic 124. The power reduction module 128 may also detect that data transmitted to the processor 102 over the period of time does not relate to operations to be performed by hardware components other than the multimedia logic 124. In some examples, the power reduction module 128 can turn off the power or reduce the refresh rate of the memory device 104. The power reduction module 128 may transmit data related to operations to be performed by the multimedia logic 124 directly to the processor cache 106 through a direct memory access channel 130, or any other suitable direct input/output interconnect. In some embodiments, the processor cache 106 can also transmit data directly to multimedia logic 124 through a direct memory access channel 132, or any other suitable direct input/output interconnect.

In some embodiments, the power reduction module 128 may also transfer the data in the memory device 104 prior to stopping the flow of power to the memory device 104. For example, the power reduction module 128 may detect that the memory device 104 is a volatile memory device. The power reduction module 128 may transfer the data (also referred to herein as memory data) from the memory device 104 to the storage device 126 prior to turning off the power or modifying the refresh rate of the memory device 104. The power reduction module 128 may also transfer the memory data from the storage device 126 to the memory device 104 once the power reduction module 128 detects that a processor 102 is to execute additional operations. For example, the power reduction module 128 may detect that a processor 102 is to execute additional operations related to hardware components other than the multimedia logic 124, such as the display interface 114, among others. In some embodiments, the power reduction module 128 may also turn off power to a sensor hub 120 and sensors 122 in response to detecting that a processor is to execute an operation for a hardware component such as the multimedia logic 124.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, digital signal processors, etc.). Furthermore, any of the functionalities of the power reduction module 128 may be partially, or entirely, implemented in hardware and/or in the processor 102. For example, the functionality may be implemented with an application specific integrated circuit, in the logic implemented in an I/O device 112, or logic implemented in an embedded controller, among others. In some embodiments, the instructions of the power reduction module 128 can be transmitted and stored in the memory device 104 and/or the processor cache 106 as the processor 102 executes the instructions of the power reduction module 128. In some embodiments, the functionalities of the power reduction module 128 can be implemented with processing logic, wherein the processing logic, as referred to herein, can include any suitable hardware (e.g., a processor, among others), software (e.g., an application, among others), firmware, or any suitable combination of hardware, software, and firmware.

Figure 2:
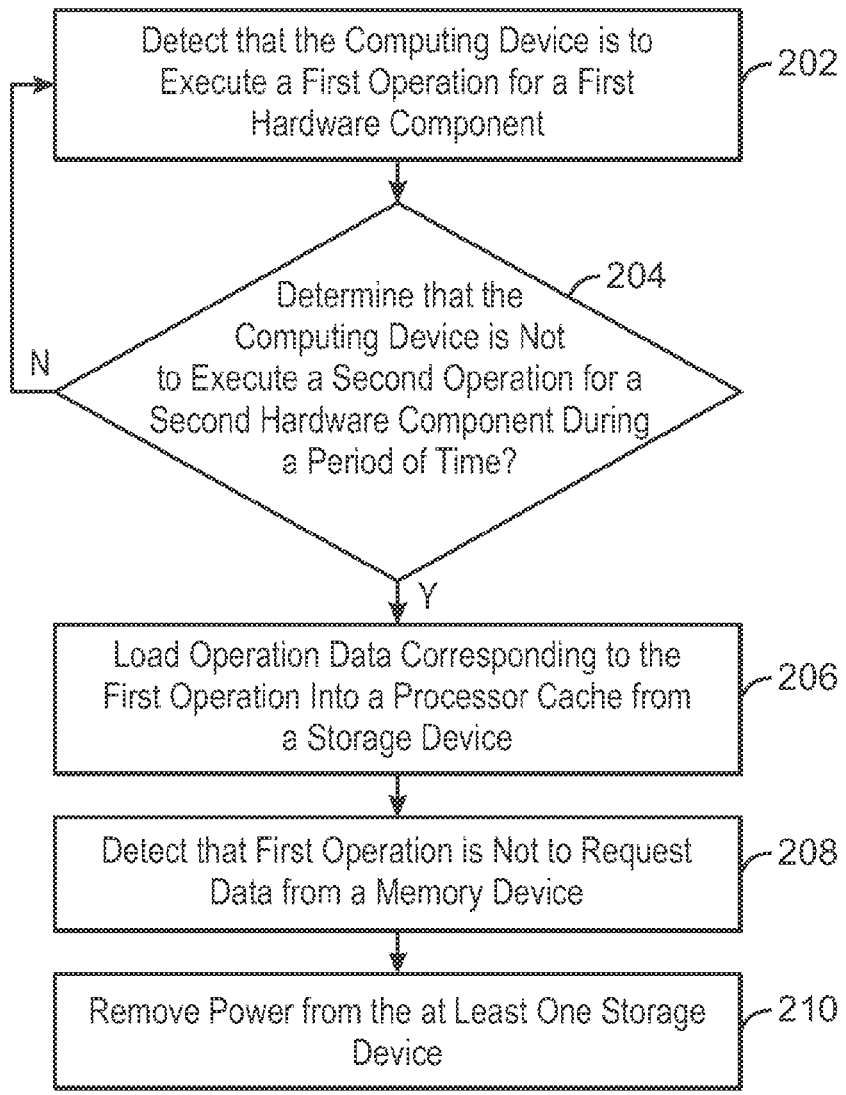
FIG. 2 is a process flow diagram of an example method for reducing power consumption by turning off power to hardware components.

FIG. 2 is a process flow diagram of an example method for reducing power consumption by turning off power to hardware components. The method 200 can be implemented with any suitable computing device, such as the computing device 100 of FIG. 1.

At block 202, the power reduction module 128 can detect that the computing device is to execute a first operation for a first hardware component. In some embodiments, the power reduction module 128 can monitor the data transmitted to a processor from additional components, such as an audio device, a storage device, a memory device, or additional hardware components. In some examples, the power reduction module 128 can monitor the data stored in the processor cache of a computing device. The processing cache may include any suitable amount of data related to any number of instructions that a processor is to execute. In some examples, the power reduction module 128 can detect that the data stored in the processor cache or the data sent to the processor correspond to a first operation. The first operation can include processing multimedia data and generating video and/or audio output resulting from the multimedia data. For example, the first operation can include audio file playback or video playback.

At block 204, the power reduction module 128 can determine that the computing device is not to execute a second operation for a second hardware component during a period of time. In some embodiments, the power reduction module 128 can detect that data corresponding to operations other than the first operation are not stored in the processor cache or have not been sent to the processor cache. In some examples, the power reduction module 128 may also determine that a set of operations are stored in the processor cache and that the set of instructions involve a common hardware component. For example, a set of operations related to audio feedback may involve audio logic, or multimedia logic. In some embodiments, the power reduction module 128 may determine that a second operation for a second hardware component is not to be executed by the process within a predetermined period of time. In some examples, the predetermined period of time can be any suitable number stored in a storage device or any other suitable non-volatile memory device, among others.

If the power reduction module 128 determines that the computing device is to execute a second operation for a second hardware component with a period of time, the process flow returns to block 202. If the power reduction module 128 determines that the computing device is not to execute a second operation for a second hardware component within a period of time, the process flow continues at block 206.

At block 206, the power reduction module 128 can load operation data corresponding to the operation into a processor cache from a storage device such as a non-volatile storage device, among others. Operation data, as referred to herein, can include any suitable amount of data related to the execution of an operation. For example, operation data may include the data related to an audio file for an audio playback operation. In some embodiments, the power reduction module 128 can load any suitable amount of operation data corresponding to the first operation into processor cache. In some examples, the processor may execute the first operation from the processor cache without accessing a volatile memory device. The processor may request and receive operation data related to the first operation directly from a storage device or any other suitable non-volatile memory device.

At block 208, the power reduction module 128 can detect that the first operation is not to request memory data from a memory device. In some embodiments, the power reduction module 128 can monitor the requests for data stored within the processor cache. For example, the power reduction module 128 may determine that the instructions stored within the processor cache may request data from a storage device but the instructions may not request data from a memory device.

At block 210, the power reduction module 128 can remove power from at least one storage device. In some embodiments, the at least one storage device can include a memory device, a non-volatile storage device, or any combination thereof. In some embodiments, the power reduction module 128 can store the data (also referred to herein as memory data) from the volatile memory device in a storage device prior to removing power from the volatile memory device. In some examples, the power reduction module 128 can also stop the transmission of data through a system interconnect between a processor and a volatile memory device or a memory controller and a volatile memory device. In some embodiments, the power reduction module 128 can also indicate to a memory controller to reduce the refresh rate of a volatile memory device in order to reduce power consumption.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 can include the power reduction module 128 detecting a request to execute a backup operation and sending requested data from the storage device to a backup device. In some embodiments, the power reduction module 128 can remove power from a volatile memory device and send data directly from the storage device to the processor cache while performing a backup operation. Furthermore, in some embodiments, the power reduction module 128 may detect data transmitted from a network interface card to the processor cache and determine that the data transmitted from the network interface card does not request memory data stored in a memory device. The power reduction module 128 may also remove the power to the memory device. Additionally, the power reduction module 128 may detect compressed data stored in the processor cache and determine that a digital signal processor or the processor is to decompress the compressed data and send the decompressed data to a hardware component.

Figure 3:
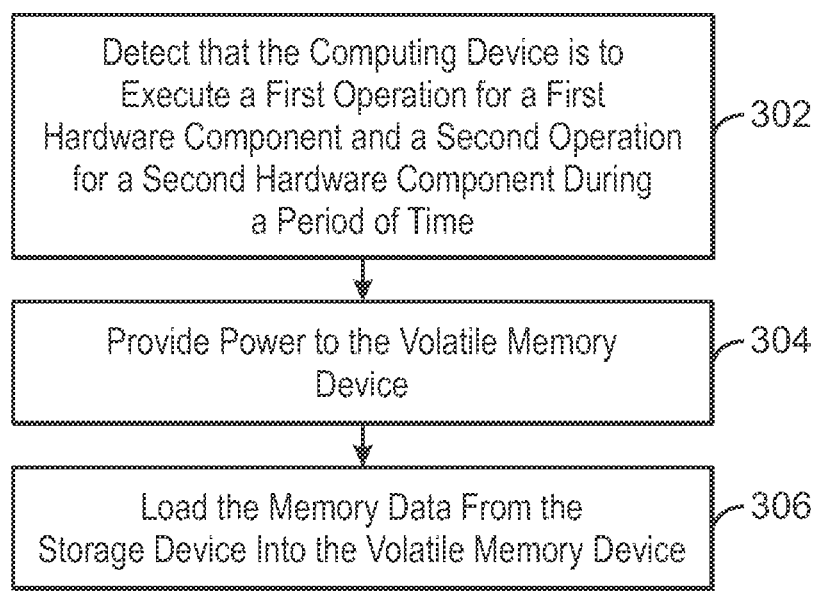
FIG. 3 is a process flow diagram of an example method for restoring power to hardware components.

FIG. 3 is a process flow diagram of an example method for restoring power to hardware components. The method 300 can be implemented with any suitable computing device, such as the computing device 100 of FIG. 1.

At block 302, the power reduction module 128 can detect that the computing device is to execute a first operation for a first hardware component and a second operation for a second hardware component during a period of time. In some embodiments, the power reduction module 128 can monitor the instructions stored in the processor cache or monitor the instructions transmitted to the processor cache via a system interconnect.

At block 304, the power reduction module 128 can provide power to the volatile memory device. In some embodiments, providing power to the volatile memory device can enable the execution of the second operation. For example, the power reduction module 128 may determine that the second operation includes a request for data stored in the volatile memory device. The power reduction module 128 can provide power to the volatile memory device to enable the volatile memory device to access and provide previously stored data.

At block 306, the power reduction module 128 can load the memory data from the storage device into the volatile memory device. In some embodiments, the memory data can correspond to data previously stored in the volatile memory device. For example, the memory data may include any suitable amount of data that correspond to the state of the volatile memory device before power was removed from the volatile memory device.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
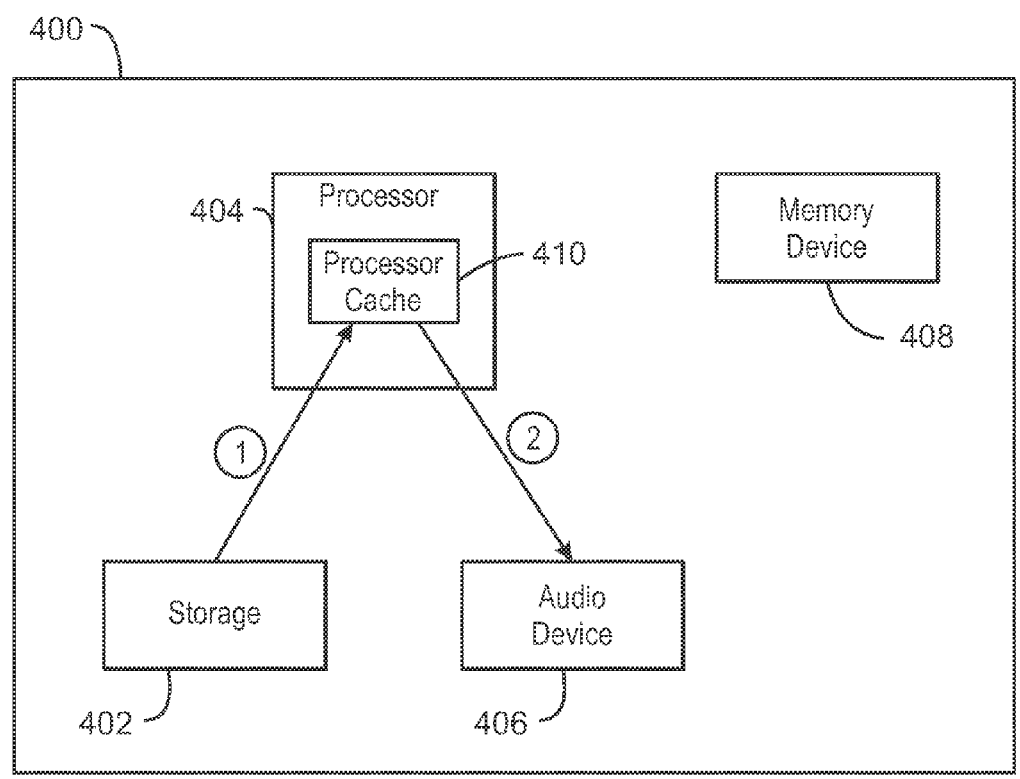
FIG. 4 is an example of a block diagram of a computing device that can reduce power consumption by operating without a memory device.

FIG. 4 is an example of a block diagram of a computing device that can reduce power consumption by operating without a memory device. The computing device 400 can include a storage device 402, a processor 404, an audio device 406, and a memory device 408. As discussed above, the memory device 408 may not receive power if a processor 404 is to execute instructions during a period of time for a hardware component such as the audio device 406, among others. In some examples, the processor 404 may determine that the memory device 408 is not to receive power by monitoring a processor cache 410 that can store any suitable number of instructions that the processor 404 is to execute. In some embodiments, the processor 404 can detect an instruction in the processor cache 410 that indicates the memory device 408 is not to receive power. For example, the processor 404 may detect that instructions to be executed within a period of time are related to an operation for a hardware component such as the audio device 406.

In some embodiments, the processor 404 may execute instructions from the processor cache 410 received directly from the storage device 402 (as indicated by the circled 1). In some embodiments, the processor 404 can execute instructions that generate audio output and send data directly to the audio device 406 (as indicated by the circled 2). The processor 404 may also detect an instruction in the processor cache 410 that corresponds to a second operation that the audio device 406 may not execute. The processor 404 may restore power to the memory device 408. In some examples, the processor 404 may also initiate the transfer of data from the storage device 402 to the memory device 408.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, additional modules, additional network interfaces, etc.). Furthermore, any of the functionalities of the processor 404 may be partially, or entirely, implemented in additional hardware. For example, the functionality may be implemented with an application specific integrated circuit, in the logic implemented in a storage device 402, or logic implemented in an embedded controller, among others.

Figure 5:
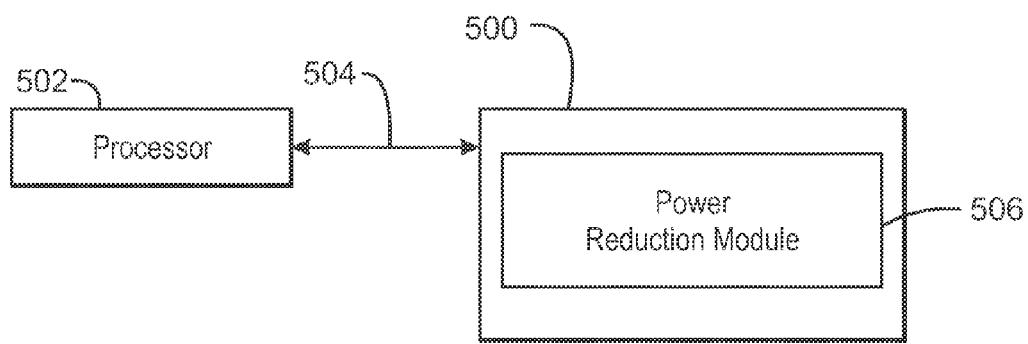
FIG. 5 is a block diagram depicting an example of a tangible, non-transitory computer-readable medium that can reduce power consumption by turning off power to hardware components.

FIG. 5 is a block diagram depicting an example of a tangible, non-transitory computer-readable medium that can reduce power consumption of a computing device by turning off power to hardware components. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, an power reduction module 506 may be adapted to direct the processor 502 to reduce power consumption of a computing device by stopping the power to a volatile memory device. For example, the power consumption module 506 may detect that the processor 502 is to execute a first operation for a first hardware component during a period of time and retrieve data related to the first operation from a storage device while turning off power to a volatile memory device. It is to be understood that any number of additional software components not shown in FIG. 5 may be included within the tangible, non-transitory, computer-readable medium 500, depending on the specific application.

Example 1

A method for reducing power consumption of a computing device is described herein. The method can include detecting that the computing device is to execute a first operation for a first hardware component and determining that the computing device is not to execute a second operation for a second hardware component during a period of time. The method can also include loading operation data corresponding to the first operation into a processor cache from a non-volatile storage device and detecting that the first operation is not to request memory data from a volatile storage device. Furthermore, the method can include removing power from at least one storage device.

In some embodiments, the method can also include transferring memory data from the volatile storage device into the non-volatile storage device prior to removing power from the volatile storage device. In some examples, the first operation comprises one of an audio file playback and a video playback. Furthermore, the method can include reducing the refresh rate of the volatile storage device. Additionally, the method can also include detecting the computing device is to execute the second operation for the second hardware component during the period of time, providing power to the volatile storage device, and loading the memory data from the non-volatile storage device into the volatile storage device.

Example 2

A system for reducing power consumption is also described herein. In some embodiments, the system includes a non-volatile storage device to store processing logic executable instructions, a volatile storage device to store copies of the processing logic executable instructions, a cache to store copies of the processing logic executable instructions, and processing logic. In some examples, the processing logic can detect that the system is to execute a first operation for a first hardware component and determine that the system is not to execute a second operation for a second hardware component during a period of time. The processing logic can also load operation data corresponding to the first operation into the cache from the non-volatile storage device. Furthermore, the processing logic can detect that the first operation is not to request memory data from the volatile storage device, and remove power to at least one storage device.

In some embodiments, the processing logic can store memory data from the volatile storage device in the non-volatile storage device prior to removing power from the volatile storage device. The processing logic can also detect a request to execute a backup operation, and send requested data from the non-volatile storage device to a backup device. Additionally, the processing logic may detect the first operation corresponds to a hardware component, and stop the flow of power to the hardware component.

Example 3

A non-transitory, computer-readable medium comprising a plurality of instructions that can reduce power consumption are also described herein. In some embodiments, the instructions, in response to being executed on a computing device, cause the computing device to detect that the computing device is to execute a first operation for a first hardware component and determine that the computing device is not to execute a second operation for a second hardware component during a period of time. The instructions can also cause the computing device to load operation data corresponding to the first operation into a processor cache from a storage device, and remove power from a volatile memory device.

In some embodiments, the instructions cause the computing device to detect the computing device is to execute the second operation for the second hardware component during the period of time, provide power to the volatile memory device, and load the memory data from the storage device into the volatile memory device. In some examples, the plurality of instructions can also cause the computing device to detect a request to execute a backup operation, and send requested data from the storage device to a backup device. Furthermore, the instructions can cause the computing device to detect the first operation corresponds to a hardware component and stop the flow of power to the hardware component. In some examples, the hardware component is a sensor hub.

Example 4

An apparatus for reducing power consumption is also described herein. The apparatus can include a cache to store processing logic executable instructions, and processing logic. The processing logic can detect that the apparatus is to execute a first operation for a first hardware component and determine that the apparatus is not to execute a second operation for a second hardware component during a period of time. The apparatus can also load operation data corresponding to the first operation into the cache from the non-volatile storage device and detect that the first operation is not to request memory data from the volatile storage device. Furthermore, the apparatus can remove power to at least one storage device. In some embodiments, the at least one storage device comprises the non-volatile storage device, the volatile storage device, or any combination thereof.

Although an example embodiment of the disclosed subject matter is described with reference to block and flow diagrams in FIGS. 1-5, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for reducing power consumption of a computing device, comprising:
    detecting that the computing device is to execute a first operation for a first hardware component;
    determining that the computing device is not to execute a second operation for a second hardware component during a period of time;
    loading operation data corresponding to the first operation into a processor cache of the computing device from a non-volatile storage device;
    detecting that the first operation is not to request memory data from a volatile storage device of the computing device;
    removing power from at least one storage device comprising the volatile storage; and
    executing the first operation via the processor cache while removing power from the volatile storage device.

2. The method of claim 1, comprising transferring memory data from the volatile storage device to the non-volatile storage device prior to removing power from the volatile storage device, wherein removing power comprises turning off power to the volatile storage device in response to detecting that the computing device is to execute the first operation, wherein the volatile storage device comprises random access memory (RAM), and wherein executing the first operation comprises transmitting data via a direct memory access channel from the processor cache to the first hardware component.

3. The method of claim 1, wherein the first operation comprises an audio file playback or a video playback, or both, wherein the first hardware component comprises multimedia logic, wherein loading operation data comprise loading operation data corresponding to the first operation directly into the processor cache from the non-volatile storage device via a direct memory access channel, and wherein executing the first operation comprises transmitting data directly from the processor cache to the multimedia logic via another direct memory access channel.

4. The method of claim 1, wherein removing power from the volatile storage device comprises reducing the refresh rate of the volatile storage device, wherein executing the first operation comprises executing by the first hardware component the first operation via the processor cache and a direct memory access channel while removing power from the volatile storage device, and wherein the first hardware component comprises an audio device.

5. The method of claim 1, comprising:
    detecting, after determining that the computing device is not to execute the second operation during the period of time, that the computing device is to execute the second operation for the second hardware component during a subsequent period of time;
    providing, after the removing power, power to the volatile storage device for the subsequent period of time; and loading memory data from the non-volatile storage device into the volatile storage device while the providing power to the volatile storage device for the subsequent period of time.

6. The method of claim 1, wherein the first operation comprises:
    detecting a request to execute a backup operation; and
    sending requested data from the non-volatile storage device to a backup device.

7. The method of claim 1, comprising:
    detecting the first operation corresponds to a hardware component in addition to the first hardware component; and
    stopping flow of power to the hardware component.

8. The method of claim 7, wherein the hardware component is a sensor hub, wherein the first hardware component comprises multimedia logic, and wherein loading operation data comprise loading operation data corresponding to the first operation into the processor cache from the non-volatile storage device before executing the first operation, and wherein power is not removed from the non-volatile storage device while the first operation is executing or in response to detecting that the computing device is to execute the first operation.

9. The method of claim 1, wherein the at least one storage device comprises the non-volatile storage device, wherein the first hardware component comprises an audio device, wherein executing the first operation comprises processing multimedia data and generating video and/or audio output resulting from the multimedia data while removing power from the volatile storage device, and wherein the multimedia data is transferred from the processor cache to the audio device via a direct memory access channel.

10. A system for reducing power consumption comprising:
    a non-volatile storage device to store processing logic executable instructions;
    a volatile storage device of a computing device to store copies of the processing logic executable instructions;
    a cache of the computing device to store copies of the processing logic executable instructions; and
    processing logic to:
        detect that the system is to execute a first operation for a first hardware component;
        determine that the system is not to execute a second operation for a second hardware component during a period of time;
        load operation data corresponding to the first operation into the cache from the non-volatile storage device;
        detect that the first operation is not to request memory data from the volatile storage device;
        remove power from at least one storage device comprising the volatile storage device; and
        execute the first operation via the cache while the removing power from the volatile storage device.

11. The system of claim 10, wherein the processing logic is to store memory data from the volatile storage device into the non-volatile storage device prior to removing power from the volatile storage device, wherein to load operation data comprises to load operation data corresponding to the first operation into the cache from the non-volatile storage device via a direct memory access channel, and wherein the first hardware component comprises an audio device.

12. The system of claim 10, wherein the first operation comprises at least one of an audio file playback or a video playback, wherein the first hardware component comprises multimedia logic, wherein to remove power comprises to turn off power to the volatile storage device in response to detecting that the system is to execute the first operation, and wherein to execute the first operation comprises to transmit data via a direct memory access channel from the cache to the multimedia logic.

13. The system of claim 10, wherein the at least one storage device comprises the non-volatile storage device.

14. The system of claim 10, wherein power to the non-volatile storage device is not removed during execution of the first operation or in response to detecting the computing device is to execute the first operation, and wherein the processing logic is to:
    detect the system is to execute the second operation for the second hardware component during a second period of time;
    provide power to the volatile storage device during the second period of time; and
    load memory data from the non-volatile storage device into the volatile storage device during the second period of time.

15. The system of claim 10, wherein the processing logic is to
    detect a request to execute a backup operation; and
    send requested data from the non-volatile storage device to a backup device.

16. The system of claim 10, wherein the processing logic is to:
    detect the first operation corresponds to a hardware component; and
    stop the flow of power to the hardware component.

17. The system of claim 16, wherein the hardware component is a sensor hub.

18. A non-transitory, computer-readable medium comprising a plurality of instructions that, in response to being executed on a computing device, cause the computing device to:
    detect that the computing device is to execute a first operation for a first hardware component;
    determine that the computing device is not to execute a second operation for a second hardware component during a period of time;
    load operation data corresponding to the first operation into a processor cache of the computing device from a non-volatile storage device;
    detect that the first operation is not to request memory data from a volatile storage device of the computing device; and
    remove power from at least one storage device comprising the volatile storage device, wherein the computing device to execute, via the processor cache, the first operation while power is removed from the volatile storage device.

19. The non-transitory, computer-readable medium of claim 18, wherein the at least one storage device comprises the non-volatile storage device, and wherein to load operation data comprises to load operation data corresponding to the first operation into the processor cache from the non-volatile storage device via direct memory access.

20. The non-transitory, computer-readable medium of claim 18, wherein to execute the first operation comprises to transmit data from the processor cache to the first hardware component via a direct memory access, and wherein the plurality of instructions cause the computing device to:
    detect the computing device is to execute the second operation for the second hardware component during the period of time;
    provide power to the volatile storage device after removing power from the volatile storage device; and load memory data from the non-volatile storage device into the volatile storage device after detecting the computing device is to execute the second operation.

21. The non-transitory, computer-readable medium of claim 18, wherein the plurality of instructions cause the computing device to:
   detect a request to execute a backup operation; and
   send requested data from the non-volatile storage device to a backup device.

22. The non-transitory, computer-readable medium of claim 18, wherein the plurality of instructions cause the computing device to:
   detect the first operation corresponds to a hardware component; and
   stop the flow of power to the hardware component.

23. The non-transitory, computer-readable medium of claim 22, wherein the hardware component is a sensor hub, and wherein the first hardware component comprises media logic.

24. An apparatus for reducing power consumption, comprising:
   a volatile storage device;
   a cache to store processing logic executable instructions; and
   processing logic to:
      detect that the apparatus is to execute a first operation for a first hardware component;
      determine that the apparatus is not to execute a second operation for a second hardware component during a period of time;
      load operation data corresponding to the first operation into the cache from the non-volatile storage device via a direct memory access channel;
      detect that the first operation is not to request memory data from the volatile storage device;
      remove power to at least one storage device comprising the volatile storage device in response to detecting the apparatus is to execute the first operation; and
      execute via the cache the first operation while power is removed from the volatile storage device, wherein to execute comprises to transmit data from the cache to first hardware component via another direct memory access channel.

25. The apparatus of claim 24, wherein the first hardware component comprises an audio device, and wherein to remove power comprises to turn off power to the volatile storage device through the first period of time.

* * * * *